(12) United States Patent
Tautz

(10) Patent No.: US 8,611,025 B2
(45) Date of Patent: Dec. 17, 2013

(54) OPTICAL SYSTEM

(75) Inventor: Volker Tautz, Wetzlar (DE)

(73) Assignee: Carl Zeiss Sports Optics GmbH, Wetzlar (DE)

(*) Notice: Subject to any disclaimer, the term of this patent is extended or adjusted under 35 U.S.C. 154(b) by 46 days.

(21) Appl. No.: 12/381,226

(22) Filed: Mar. 9, 2009

(65) Prior Publication Data

US 2009/0231733 A1 Sep. 17, 2009

(30) Foreign Application Priority Data

Mar. 11, 2008 (DE) .......................... 10 2008 013 702

(51) Int. Cl.
*G02B 13/02* (2006.01)
*G02B 9/62* (2006.01)

(52) U.S. Cl.
USPC .......................................... 359/745; 359/756

(58) Field of Classification Search
USPC ................. 359/745, 746, 755, 756, 750, 752, 359/760–762
See application file for complete search history.

(56) References Cited

U.S. PATENT DOCUMENTS

| | | | |
|---|---|---|---|
| 3,770,341 A | 11/1973 | Itoh | |
| 4,183,626 A | 1/1980 | Rogers | |
| 4,329,024 A | 5/1982 | Rogers | |
| 5,210,646 A | 5/1993 | Mercado et al. | |
| 5,952,256 A | 9/1999 | Morishita et al. | |
| 6,028,720 A | 2/2000 | Wartmann et al. | |
| 6,226,132 B1 | 5/2001 | Abe | |
| 6,717,739 B2 | 4/2004 | Zimmer et al. | |
| 6,853,494 B2 | 2/2005 | Sander et al. | |
| 6,856,468 B2 | 2/2005 | Achtner | |
| 7,535,654 B2 * | 5/2009 | Ohashi | 359/690 |
| 2003/0210470 A1 | 11/2003 | Zimmer et al. | |
| 2004/0125445 A1 | 7/2004 | Hoogland | |
| 2005/0185301 A1 | 8/2005 | Karbe | |

(Continued)

FOREIGN PATENT DOCUMENTS

| | | |
|---|---|---|
| AT | 300 402 | 11/1971 |
| DE | 1 770 378 | 7/1958 |

(Continued)

OTHER PUBLICATIONS

Kador & Partner correspondence to Patentanwalte Freischem dated Mar. 12, 2010 re: Reference K 57 313/13 ar, English Translation, including Enclosures 4-9.

(Continued)

*Primary Examiner* — Alicia M Harrington
(74) *Attorney, Agent, or Firm* — Muirhead and Saturnelli, LLC

(57) ABSTRACT

An optical system for imaging an object on an image acquisition unit includes a first lens unit, a second lens unit, a third lens unit, a fourth lens unit, a fifth lens unit, and a sixth lens unit disposed from the object in the direction of the image acquisition unit. The second lens unit is manufactured from a material whose deviation of the relative partial dispersion fulfills the condition: $\Delta\theta_{g,F} > 0.025$. The third lens unit is manufactured from a material whose deviation of the relative partial dispersion fulfills the condition: $\Delta\theta_{g,F} < -0.0015$. The fifth lens unit is manufactured from a material whose deviation of the relative partial dispersion fulfills the condition: $\Delta\theta_{g,F} < -0.005$. According to the disclosed system, the secondary spectrum is reduced and a relative aperture is sufficient so that the optical system is usable in a telescopic sight.

15 Claims, 2 Drawing Sheets

(56) References Cited

U.S. PATENT DOCUMENTS

| | | |
|---|---|---|
| 2007/0297068 A1 | 12/2007 | Ohashi |
| 2009/0197755 A1* | 8/2009 | Uehara ........................ 501/63 |
| 2009/0231733 A1 | 9/2009 | Tautz |

FOREIGN PATENT DOCUMENTS

| | | |
|---|---|---|
| DE | 7041703 | 11/1970 |
| DE | 22 08 282 C3 | 4/1975 |
| DE | 28 39 250 A1 | 12/1981 |
| DE | 240 612 A1 | 11/1986 |
| DE | 292 552 A5 | 8/1991 |
| DE | 41 07 070 A1 | 9/1992 |
| DE | 102 25 192 A1 | 1/2004 |
| DE | 102 49 282 A1 | 5/2004 |
| DE | 102 49 702 A1 | 5/2004 |
| DE | 102 58 733 A1 | 6/2004 |
| DE | 10 2004 008 997 B4 | 12/2005 |
| DE | 102 22 041 B4 | 1/2006 |
| DE | 197 54 758 B4 | 4/2007 |
| DE | 10 2008 013 702 A1 | 9/2009 |
| EP | 0 950 911 A2 | 10/1999 |
| EP | 1 431 699 B1 | 9/2003 |
| EP | 1 431 699 A2 | 6/2004 |
| EP | 1 431 699 B1 | 6/2008 |
| EP | 2 101 208 A1 | 9/2009 |
| JP | 2000-35534 | 2/2000 |

OTHER PUBLICATIONS

Dr. Volker Tautz, "Concerning the glass choice with objectives with reduced secondary spectrum for spotting scopes and binoculars", Presentation at the 50th International Scientific Colloquium at the Technical University of Ilmenau, Sep. 2005, English Translation.
Reconstruction "Zeiss Diascope 85 T*FL" dated Jul. 13, 2009.
Schott Test Report No. 21-2010 00092 of Feb. 5, 2010.
Schott Supplement to Test Report dated Feb. 8, 2010.
$\Delta\ominus_{gF}$ values "Zeiss Diascope 85 T*FL" of 2001.
Reconstruction "Zeiss 8 x 56 T*FL," cited as D5 in German Opposition dated Nov. 24, 2010, 1 p. (with English translation of notations, 1 p.).
Reconstruction "Zeiss 10 x 56 T*FL," cited as D6 in German Opposition dated Nov. 24, 2010, 1 p. (with English translation of notations, 1 p.).
Annex A1 to Reply to German Opposition filed Jun. 14, 2011, "Handelregisterauszug der Carl Zeiss Sports Optics GmbH," retrieved on Feb. 16, 2011, 2 pp. (with English translation thereof).
Annex A2 to Reply to German Opposition filed Jun. 14, 2011, "Schnittbild des Objektivs Diascope 85 T*FL," prepared on Apr. 28, 2000, 2 pp. (with English translation thereof).
Annex A3 to Reply to German Opposition filed Jun. 14, 2011, "Schnittbild eines Okulars mit der Brennweite f=12,8 mm," prepared on Oct. 15, 1999, 1 p. (with English translation thereof).
Annex A4 to Reply to German Opposition filed Jun. 14, 2011, "Schnittbild eines Okulars mit der Brennweite f=16,74 mm," prepared on Jul. 04, 2000, 1 p. (with English translation thereof).
Annex A5 to Reply to German Opposition filed Jun. 14, 2011, Schnittbild eines Okulars mit variabler Brennweite (f=8,37mm bis 25,1mm), prepared on Nov. 01, 1999, 2 pp. (with English translation thereof).
Annex A6 to Reply to German Opposition filed Jun. 14, 2011, "Schnittbild des 'Fernglases Victory 8x56 T*FL'," prepared on Sep. 06, 2005, 2 pp. (with English translation thereof).
Annex A7 to Reply to German Opposition filed Jun. 14, 2011, "Schnittbild des 'Fernglases Victory 10x56 T*FL'," prepared on Sep. 07, 2005, 2 pp. (with English translation thereof).
Annex A8 to Reply to German Opposition filed Jun. 14, 2011, Clean and marked-up versions of claims for DE 10 2008 013 702.2 dated Feb. 2011 (with English translation thereof).
Annex A9 to Reply to German Opposition filed Jun. 14, 2011, Clean and marked-up versions of specification pp. 2B, 4, 5, 5A for DE 10 2008 013 702.2 (with English translation thereof).
Ohara table, cited as D7 in German Opposition filing dated Feb. 23, 2012, 2 pp. (in English).
Ohara glass data, cited as D8 in German Opposition filing dated Feb. 23, 2012, 3 pp. (plus English translation).
Schott Taschenkatalog [Pocket catalogue], 2007, cited as D9 in German Opposition filing dated Feb. 23, 2012, 7 pp. (plus English translation).
SAP excerpt Diascope 85 T*FL, cited as D10 in German Opposition filing dated Feb. 23, 2012, 2 pp (plus English translation).
Warranty certificate Diascope 85 T*FL, cited as D11 in German Opposition filing dated Feb. 23, 2012, 1 p (in English).
Glass-type determinations Diascope 85 T*FL, cited as D12 in German Opposition filing dated Feb. 23, 2012. 4 pp. (plus English translation).
Invoice and delivery note Zeiss Victory 8x56, dated Nov. 25, 2005, cited as D13 in German Opposition filing dated Feb. 23, 2012, 2 pp. (plus English translation).
Warranty certificate Victory 8x56, cited as D14 in German Opposition filing dated Feb. 23, 2012, 1 p. (in English).
Affidavit, dated Feb. 8, 2012, cited as D15 in German Opposition filing dated Feb. 23, 2012, 1 p. (plus English translation).
Invoice Zeiss Victory 10x56, dated Jun. 2, 2006, cited as D16 in German Opposition filing dated Feb. 23, 2012, 1 p. (plus English translation).
Warranty certificate Victory 10x56, dated Aug. 6, 2006, cited as D17 in German Opposition filing dated Feb. 23, 2012, 1 p. (in English).
Glass-type determination Zeiss Victory 10x56, dated Nov. 24, 2006, cited as D18 in German Opposition filing dated Feb. 23, 2012, 4 pp. (plus English translation).
Prospectus "Zeiss Cup 03," cited as D20 in German Opposition filing dated Feb. 23, 2012, 1 p. (plus English translation).
Filed report from "Sterne und Weltraum" [Stars and Space], Oct. 2003, cited as D21 in German Opposition filing dated Feb. 23, 2012, 8 pp. (plus English translation).
Prospectus "Carl Zeiss Sport Optics,"cited as D22 in German Opposition filing dated Feb. 23, 2012, 14 pp. (in English).
Vögel Spektivreport [Spotting-scope report] Mar. 2007, cited as D23 in German Opposition filing dated Feb. 23, 2012, 8 pp. (plus English translation).
Zeiss Prospectus IWA 2002, cited as D24 in German Opposition filing dated Feb. 23, 2012, 4 pp. (plus English translation).
Zeiss magazine "Innovation 10," 2001, cited as D25 in German Opposition filing dated Feb. 23, 2012, 2 pp. (in English).
Zeiss magazine "Innovation 12," 2002, cited as D26 in German Opposition filing dated Feb. 23, 2012, 2 pp. (in English).
Zeiss magazine "Innovation 13," 2003, cited as D27 in German Opposition filing dated Feb. 23, 2012, 2 pp. (in English).
"ABC der Optic" [Optics ABC], 1972, Dausien publishers, cited as D28 in German Opposition filing dated Feb. 23, 2012, 8 pp.
"Bauelemente der Optik" [Components of Optics], 4th edition, 1983, Carl Hanser publishes, Naumann et al., cited as D29 in German Opposition filing dated Feb. 23, 2012, 8 pp. (plus English translation).
Glass-type determination Zeiss Victory 8x56 FL, cited as D31 in German Opposition filing dated Feb. 23, 2012, 4 pp. (plus English translation).
Ohara normal line, cited as D32 in German Opposition filing dated Feb. 23, 2012, 2 pp. (in English).
Schott Taschenkatalog [Pocket catalogue], Optisches Glas, 1980, cited as D33 in German Opposition filing dated Feb. 23, 2012, 10 pp. (plus English translation).
Lexikon der Optic [Enclopedia of Optics]: in two volumes. Second vol. M to Z. Spektrum Akademische Verlag: Heidelberg, 1999. pp. 76 and 79-80. Annex A10. (with English translation).
H. Haferkorn and W. Richter. Synthese optischer Systeme [Synthesis of Optical Systems]. VEB Deutscher Verlag der Wissenschaften: Berlin, 1994. pp. 170-175. Annex A11. (with English translation).
Volker Witt, "Wie funktionieren Achromat und Apochromat?" [How do the achromat and the apochromat work?]. Part 1: From the single lens to the achromat. *Sterne und Weltraum*. Oct. 2005. pp. 72-75. Annex A12. (with English translation).
Volker Witt, "Wie funktionieren Achromat und Apochromat?" [How do the achromat and the apochromat work?]. Part 2: From the achromat to the apochromat. *Sterne und Weltraum*. Oct. 2005. pp. 76-79. Annex A13. (with English translation).

* cited by examiner

OPTICAL SYSTEM

TECHNICAL FIELD

This application relates to an optical system for imaging of an object on an image acquisition unit, in particular an objective for a telescopic sight.

BACKGROUND OF THE INVENTION

A telescopic sight is known from the related art which is composed of an objective, an ocular, and a reversal system. The telescopic sight has a variable magnification, so that objects may be observed magnified. For example, reference is made to DE 102 58 733 A1 in this regard, from which such a telescopic sight is known.

The objective of a telescopic sight of this type is typically achromatically corrected. The vertex image distances for red and blue light are thus equally long, but the vertex image distances for green light deviate. This deviation is typically referred to as a longitudinal chromatic aberration or also as a secondary spectrum. The secondary spectrum of the objective of a telescopic sight of this type often results in color fringes at light-dark transitions. These are often very annoying to an observer who observes an object using the telescopic sight. This interference is all the more obvious the greater a magnification of the object is selected on the telescopic sight.

An achromatic lens system is known from U.S. Pat. No. 6,226,132 B1, in which the secondary spectrum may be decreased by selecting a suitable deviating relative partial dispersion. However, the relative aperture of this known lens system is 1:10. But such a relative aperture is inadequate for telescopic sights.

Accordingly, it would be desirable to provide an optical system in which the secondary spectrum is decreased and whose relative aperture is sufficient so that the optical system is usable in a telescopic sight.

SUMMARY OF THE INVENTION

According to the system described herein, an optical system is provided for imaging of an object on an image acquisition unit. In various embodiments, the term image acquisition unit may be understood very broadly. For example, if the optical system according to the system described herein is implemented as the objective of a telescopic sight, the image acquisition unit may be the retina of an observer. Other exemplary embodiments may be provided in which the optical system according to the system described herein is implemented to image an object on an image acquisition unit in the form of a CCD.

The optical system according to an embodiment of the system described herein has, from the object in the direction toward an image acquisition unit, a first lens unit, a second lens unit, a third lens unit, a fourth lens unit, a fifth lens unit, and a sixth lens unit. A lens unit may be understood as an individual lens or also a lens unit composed of multiple lenses. The second lens unit may be manufactured from a material whose deviation of the relative partial dispersion fulfills the following condition:

$\Delta\theta_{g,F} > 0.025$ (condition 1).

The third lens unit may be manufactured from a material whose deviation of the relative partial dispersion fulfills the following condition:

$\Delta\theta_{g,F} < -0.0015$ (condition 2).

Furthermore, the fifth lens unit may be manufactured from a material whose deviation of the relative partial dispersion fulfills the following condition:

$\Delta\theta_{g,F} < -0.005$ (condition 3).

$\Delta\theta_{g,F}$ describes the deviation of the relative partial dispersion in regard to the g-line and the F-line from a normal line which is provided by two reference glasses.

In an embodiment of the system described herein, the glasses NSL7 and PBM2 from the OHARA company may be used. The deviation of the relative partial dispersion from this normal line is determined from the following formula:

$$\Delta\theta_{gF} = \frac{(n_g - n_F)}{(n_F - n_C)} - (0.6415 - 0.001618 \times \nu_d)$$

$n_g$ being the index of refraction for the g-line, $n_F$ being the index of refraction for the F-line, and $n_C$ being the index of refraction for the C-line. $\nu_d$ is the Abbe number for the d-line. The corresponding dimensions may be taken from the catalogs of the manufacturers of glasses for lens units.

It is noted that an optical system may be provided by the selection of the ranges of the deviation of the relative partial dispersion specified above in which the secondary spectrum is small, so that it does not disturb an observer who uses the optical system for observing an object. In addition, the optical system has a relative aperture which allows the use of the optical system in a telescope, in particular in a telescopic sight. The relative aperture of the optical system according to the system described herein may be at least 1:5.2. The relative aperture may be 1:4.

In an embodiment of the system described herein, the optical system may have a total of only 6 lenses, the first lens unit, the second lens unit, the third lens unit, the fourth lens unit, the fifth lens unit, and the sixth lens unit each being provided with precisely one lens. This embodiment has the advantage that the weight of the optical system may be kept low. This is advantageous in particular if the optical system is employed in a telescopic sight.

In a further embodiment of the system described herein, the sixth lens unit may be situated in such a way that it is displaceable along an optical axis of the optical system. The sixth lens unit—viewed from the object in the direction of an image acquisition unit—may be situated in front of an object intermediate image plane, which may be adjoined in the direction of the image acquisition unit by a reversal system and an ocular. The adjustability of the sixth lens unit is used for focusing and/or parallax-free setting.

In another embodiment of the system described herein, the first lens unit may include a converging lens. Alternatively or additionally thereto, the second lens unit may also include a converging lens.

Furthermore, the third lens unit may include a dispersive lens. In a further embodiment of the system described herein, the fourth lens unit may also include a converging lens. Furthermore, the optical system is, alternatively or additionally thereto, designed in such a way that the fifth lens unit may include a dispersive lens. The sixth lens unit may also include a dispersive lens.

In a further embodiment of the system described herein, the fourth lens unit and the fifth lens unit may form a dispersing element. They may be designed as a cemented element.

In another embodiment of the system described herein, the first lens unit, the second lens unit, the third lens unit, the fourth lens unit, the fifth lens unit, and the sixth lens unit may have the following properties (Table 1), the following properties being standardized for an optical system having a focal length of f'=100 mm:

TABLE 1

| Face | Radii | Distances [mm] | $n_e$ | $v_e$ | $\Delta\theta_{gF}$ | Glass |
|---|---|---|---|---|---|---|
| First face of the first lens | 44.524 | 3.461 | 1.48915 | 70.0 | 0.0022 | S-FSL5 |
| Second face of the first lens | −106.362 | 3.479 | | | | |
| First face of the second lens | 24.858 | 4.673 | 1.49845 | 81.1 | 0.0280 | S-FPL51 |
| Second face of the second lens | −68.077 | 0.464 | | | | |
| First face of the third lens | −63.358 | 1.056 | 1.72538 | 34.5 | −0.0019 | S-NBH8 |
| Second face of the third lens | 35.626 | 10.788 | | | | |
| First face of the fourth lens | 23.810 | 4.188 | 1.65222 | 33.5 | 0.0070 | S-TIM22 |
| First face of the fifth lens | −23.810 | 1.038 | 1.61669 | 44.0 | −0.0065 | S-NBM51 |
| Second face of the fifth lens | 16.144 | 32.014 | | | | |
| First face of the sixth lens | 166.151 | 0.727 | 1.59143 | 60.9 | −0.0018 | S-BAL35 |
| Second face of the sixth lens | 16.615 | | | | | |

In above-mentioned Table 1, the individual faces of the lens units and their radii are specified. Furthermore, the distance of the vertex of a first face to the vertex of the proximal face is specified. This also indicates the thickness of the individual lens units. Furthermore, the index of refraction is identified by $n_e$ and the Abbe number is identified by $v_e$. In addition, the type of glass of the particular lens units is specified, the notation of the types of glass relating to types of glass of the OHARA company. As noted above, the specified properties are standardized for an optical system having a focal length of f'=100 mm. The properties may be converted proportionally to other focal lengths by multiplication of the radii and distances by a factor.

In a further exemplary embodiment according to the system described herein, the first lens unit, the second lens unit, the third lens unit, the fourth lens unit, the fifth lens unit, and the sixth lens unit have the following properties (Table 2), the following properties being standardized for an optical system having a focal length of f'=100 mm:

TABLE 2

| Face | Radii | Distances [mm] | $n_e$ | $v_e$ | $\Delta\theta_{gF}$ | Glass |
|---|---|---|---|---|---|---|
| First face of the first lens | 38.827 | 2.768 | 1.48915 | 70.0 | 0.0022 | S-FSL5 |
| Second face of the first lens | −119.283 | 3.159 | | | | |
| First face of the second lens | 24.664 | 3.460 | 1.49845 | 81.1 | 0.0280 | S-FPL51 |
| Second face of the second lens | −68.056 | 0.443 | | | | |
| First face of the third lens | −63.339 | 1.038 | 1.72538 | 34.5 | −0.0019 | S-NBH8 |
| Second face of the third lens | 39.108 | 10.450 | | | | |
| First face of the fourth lens | 23.803 | 2.768 | 1.65222 | 33.5 | 0.0070 | S-TIM22 |
| First face of the fifth lens | −23.803 | 1.038 | 1.61669 | 44.0 | −0.0065 | S-NBM51 |
| Second face of the fifth lens | 15.236 | 34.497 | | | | |
| First face of the sixth lens | 166.101 | 0.727 | 1.59143 | 60.9 | −0.0018 | S-BAL35 |
| Second face of the sixth lens | 16.610 | | | | | |

The individual faces of the lens units and their radii are also specified in above-mentioned Table 2. Furthermore, the distance of the vertex of a first face to the vertex of the proximal face is specified. This indicates the thickness of the individual lens units. Furthermore, the index of refraction is identified by $n_e$ and the Abbe number is identified by $v_e$. In addition, the type of glass of the particular lens units is specified, the notation of the types of glass relating to types of glass of the OHARA company. As noted above, the specified properties are standardized for an optical system having a focal length of f'=100 mm. The properties may be converted proportionally to other focal lengths by multiplication of the radii and distances by a factor.

In a further exemplary embodiment of the optical system according to the system described herein, based on the nominal values quoted in the above-mentioned tables, the radii and distances are variable within a range of ±10%, the indices of refraction n, within a range of about ±0.05 and the Abbe numbers $v_e$ are variable within a range of about ±5.

The system described herein may also relate to a telescope, in particular a telescopic sight, which is designed having an optical system which has at least one of the above-mentioned features or one of the above-mentioned feature combinations. In the telescope or telescopic sight, the optical system may be designed as an objective which works together with a reversal system and an ocular.

BRIEF DESCRIPTION OF THE DRAWINGS

Embodiments of the system described herein are explained in greater detail hereafter on the basis of the figures which are briefly described as follows.

DETAILED DESCRIPTION OF VARIOUS EMBODIMENTS

It is to be understood that the term image acquisition unit may be used broadly in connection with the various embodiments described herein. For example, if the optical system is implemented as the objective of a telescopic sight, the image acquisition unit is the retina of an observer. Other exemplary embodiments may be provided in which the optical system according to the system described herein is implemented for imaging of an object on an image acquisition unit in the form of a CCD.

Figure 1:
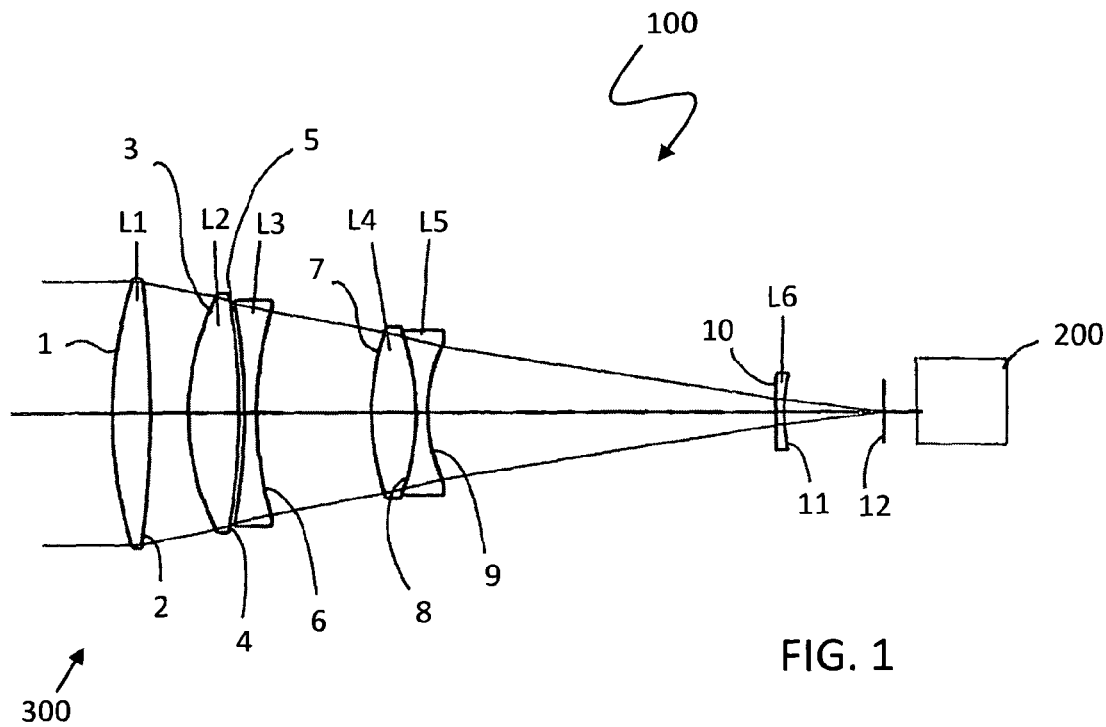
FIG. 1 shows a schematic illustration of a first embodiment of a telescopic sight having an optical system.

FIG. 1 shows a schematic illustration of a first embodiment of a telescopic sight 100. It may include an optical system in the form of an objective 300 and an ocular 200, ocular 200 only being schematically shown. Ocular 200 may also include a reversal system.

From the object (not shown) in the direction of an image acquisition unit in the form of a retina of an observer (not shown) or in the direction of ocular 200, objective 300 of telescopic sight 100 has a first lens unit L1, a second lens unit L2, a third lens unit L3, a fourth lens unit L4, a fifth lens unit L5, and a sixth lens unit L6. In this exemplary embodiment, all lens units L1 through L6 are each only composed of a single lens, so that the number of lenses of objective 300 is limited to a total of 6. First lens unit L1 is designed as a converging lens, second lens unit L2 as a converging lens, third lens unit L3 as a dispersive lens, fourth lens unit L4 as a converging lens, fifth lens unit L5 as a dispersive lens, and sixth lens unit L6 as a dispersive lens. Fourth lens unit L4 and fifth lens unit L5 form a dispersive element.

Sixth lens unit L6 is situated in such a way that it is displaceable along the optical axis of objective 300—from an object in the direction of a retina of an observer or in the direction of ocular 200—in front of an objective intermediate image plane 12. The adjustability of sixth lens unit L6 is used for focusing and/or parallax-free setting.

The properties of individual lens units L1 through L6 are specified hereafter in Table 3:

TABLE 3

| Face number | Radii | Distances [mm] | $n_e$ | $v_e$ | $\Delta\theta_{gF}$ | Glass |
|---|---|---|---|---|---|---|
| 1 | 44.524 | 3.461 | 1.48915 | 70.0 | 0.0022 | S-FSL5 |
| 2 | −106.362 | 3.479 | | | | |
| 3 | 24.858 | 4.673 | 1.49845 | 81.1 | 0.0280 | S-FPL51 |
| 4 | −68.077 | 0.464 | | | | |
| 5 | −63.358 | 1.056 | 1.72538 | 34.5 | −0.0019 | S-NBH8 |
| 6 | 35.626 | 10.788 | | | | |
| 7 | 23.810 | 4.188 | 1.65222 | 33.5 | 0.0070 | S-TIM22 |
| 8 | −23.810 | 1.038 | 1.61669 | 44.0 | −0.0065 | S-NBM51 |
| 9 | 16.144 | 32.014 | | | | |
| 10 | 166.151 | 0.727 | 1.59143 | 60.9 | −0.0018 | S-BAL35 |
| 11 | 16.615 | | | | | |

The properties cited in Table 3 apply to an objective 300 having a focal length of f'=100 mm and having a relative aperture of 1:4. The individual faces of individual lens units L1 through L6 are disclosed in Table 3. Furthermore, the radii of the individual faces are specified. In addition, the distance of the vertex of a first face to the vertex of the proximal face is specified. This also indicates the thickness of individual lens units L1 through L6. Because lens unit L6 is situated in such a way that it is movable, the distance between face 9 and face 10 is variable. The distance between faces 9 and 10 specified in Table 3 is therefore to be understood as only exemplary. Furthermore, the index of refraction is identified by $n_e$ and the Abbe number is identified by $v_e$ in Table 3. In addition, the type of glass of particular lens units L1 through L6 is specified, the notation of the types of glass relating to types of glass of the OHARA company. As noted above, the specified properties are standardized for an optical system 300 having a focal length of f'=100 mm. The properties may be converted proportionally to other focal lengths by multiplication of the radii and distances by a factor.

The exemplary embodiment according to FIG. 1 discussed above meets above-mentioned conditions 1 through 3. The correction of the longitudinal chromatic aberration has not been brought exactly up to the apochromatic correction in this exemplary embodiment, in which the image distance is equal for three wavelengths. Rather, an achromatic correction is achieved in which the image distance is equal for two wavelengths and in which the secondary spectrum is greatly reduced. Furthermore, a good correction of the spherical aberration and the Gaussian error is achieved by the use of lens units L4 and L5.

In the exemplary embodiment discussed above, lens unit L1 is not made of a glass which has a deviating relative partial dispersion. Glasses having a deviating relative partial dispersion are often more sensitive than other glasses, so that glasses having a deviating relative partial dispersion are not very suitable for protecting the further lens units. For this reason, lens unit L1 may be made of a somewhat less sensitive material.

Figure 2:
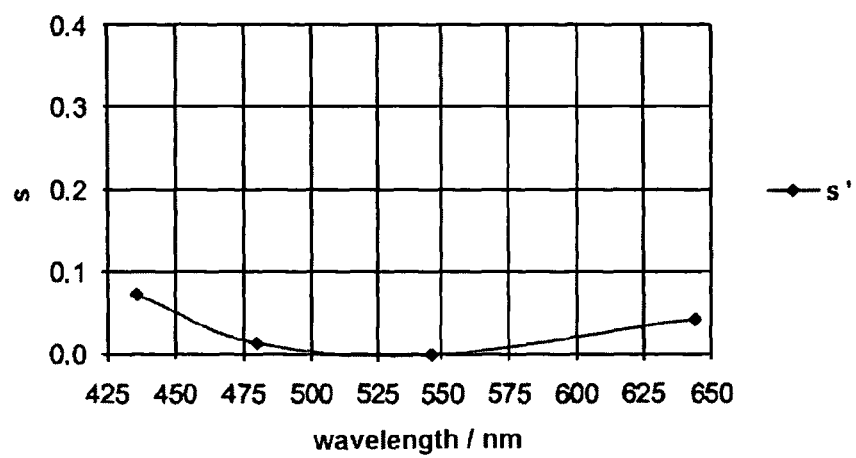
FIG. 2 shows a diagram in regard to the longitudinal chromatic aberration (secondary spectrum) for the optical system according to FIG. 1.

FIG. 2 shows a diagram in regard to the longitudinal chromatic aberration (secondary spectrum) for objective 300 according to FIG. 1. Longitudinal chromatic aberration s' is plotted over the wavelength. It is clear that longitudinal chromatic aberration s' is low.

Figure 3:
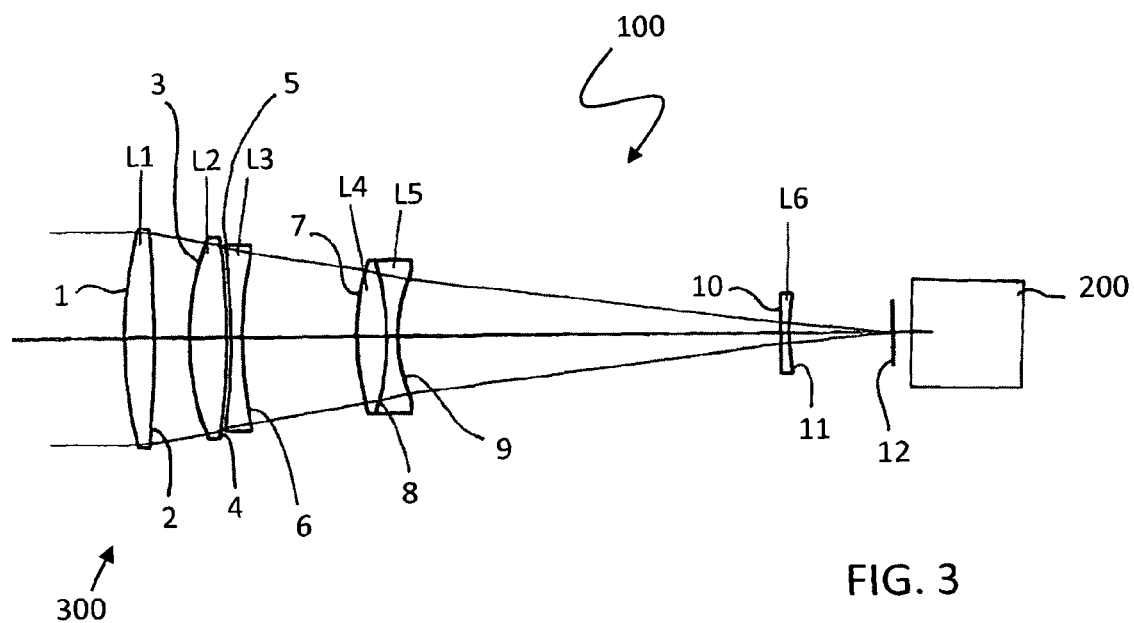
FIG. 3 shows a schematic illustration of a second embodiment of a telescopic sight having an optical system.

FIG. 3 shows a schematic illustration of a further exemplary embodiment of a telescopic sight 100 according to the system described herein, which basically corresponds to telescopic sight 100 according to FIG. 1. Identical reference numerals therefore identify identical components. In contrast to telescopic sight 100 of FIG. 1, telescopic sight 100 of FIG. 3 has an objective 300 having a focal length of f'=100 mm and a relative aperture of 1:5.2 auf. Furthermore, objective 300 according to FIG. 3 is characterized by the following properties (Table 4):

TABLE 4

| Face number | Radii | Distances [mm] | $n_e$ | $v_e$ | $\Delta\theta_{gF}$ | Glass |
|---|---|---|---|---|---|---|
| 1 | 38.827 | 2.768 | 1.48915 | 70.0 | 0.0022 | S-FSL5 |
| 2 | −119.283 | 3.159 | | | | |
| 3 | 24.664 | 3.460 | 1.49845 | 81.1 | 0.0280 | S-FPL51 |
| 4 | −68.056 | 0.443 | | | | |
| 5 | −63.339 | 1.038 | 1.72538 | 34.5 | −0.0019 | S-NBH8 |
| 6 | 39.108 | 10.450 | | | | |
| 7 | 23.803 | 2.768 | 1.65222 | 33.5 | 0.0070 | S-TIM22 |
| 8 | −23.803 | 1.038 | 1.61669 | 44.0 | −0.0065 | S-NBM51 |
| 9 | 15.236 | 34.497 | | | | |
| 10 | 166.101 | 0.727 | 1.59143 | 60.9 | −0.0018 | S-BAL35 |
| 11 | 16.610 | | | | | |

Reference is made to the explanations of Table 3 in regard to the significance of the individual variables of Table 4.

Objective 300 according to FIG. 3 has the same advantages and functions as objective 300 according to FIG. 1. In particular, above-mentioned conditions 1 through 3 are also fulfilled here. In addition, objective 300 according to FIG. 3 is designed in such a way that the construction of a narrow telescopic sight is possible therewith.

Figure 4:
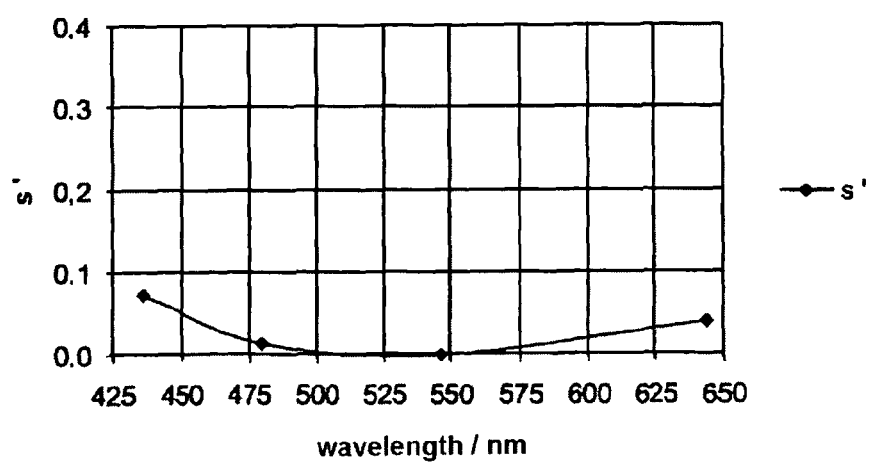
FIG. 4 shows a diagram in regard to the longitudinal chromatic aberration (secondary spectrum) for the optical system according to FIG. 3.

FIG. 4 shows a diagram in regard to the longitudinal chromatic aberration (secondary spectrum) for objective 300 according to FIG. 3. Longitudinal chromatic aberration s' is plotted over the wavelength. It is also clear here that longitudinal chromatic aberration s' is low.

The two exemplary embodiments of telescopic sight 100 and objective 300 have the advantage that optical systems are provided by the selection of the ranges of the deviation of the relative partial dispersion specified above, in which the secondary spectrum is low, in such a way that it does not annoy an observer who uses telescopic sight 100 to observe an object. In addition, objectives 300 have a relative aperture which allows the use of the optical systems in a telescopic sight. The low number of lens units L1 through L6 used has the advantage that the weight of telescopic sight 100 may be kept low.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An optical system for imaging of an object on an image acquisition unit, comprising:
   a first lens unit;
   a second lens unit;
   a third lens unit;
   a fourth lens unit;
   a fifth lens unit; and
   a sixth lens unit, wherein all of the lens units are disposed from the object in a direction of the image acquisition unit with no intervening lens units,
   wherein the first lens unit includes a converging lens,
   wherein the second lens unit includes a converging lens and is manufactured from a material whose deviation of the relative partial dispersion fulfills the following condition:

$\Delta\theta_{g,F} > 0.025$, wherein the third lens unit includes a dispersive lens and is manufactured from a material whose deviation of the relative partial dispersion fulfills the following condition:

$\Delta\theta_{g,F} < -0.0015$, wherein the fourth lens unit includes a converging lens, and
   wherein the fifth lens unit includes a dispersive lens and is manufactured from a material whose deviation of the relative partial dispersion fulfills the following condition:

$\Delta\theta_{g,F} < -0.005$.

2. The optical system as recited in claim 1, wherein the first lens unit, the second lens unit, the third lens unit, the fourth lens unit, the fifth lens unit, and the sixth lens unit each have precisely one lens.

3. The optical system as recited in claim 1, wherein the sixth lens unit is displace-able along an optical axis of the objective.

4. The optical system as recited in claim 1, wherein the sixth lens unit includes a dispersive lens.

5. The optical system as recited in claim 1, wherein the fourth lens unit and the fifth lens unit form a dispersive element.

6. An objective for imaging of an object on an image acquisition unit, comprising:
   a first lens unit;
   a second lens unit;
   a third lens unit;
   a fourth lens unit;
   a fifth lens unit; and
   a sixth lens unit, wherein all of the lens units are disposed from the object in a direction of the image acquisition unit,
   wherein the first lens unit includes a converging lens,
   wherein the second lens unit is manufactured from a material whose deviation of the relative partial dispersion fulfills the following condition:

$\Delta\theta_{g,F} > 0.025$, wherein the third lens unit includes a dispersive lens and is manufactured from a material whose deviation of the relative partial dispersion fulfills the following condition:

$\Delta\theta_{g,F} < -0.0015$, wherein the fifth lens unit is manufactured from a material whose deviation of the relative partial dispersion fulfills the following condition:

$\Delta\theta_{g,F} < -0.005$, and wherein the first lens unit, the second lens unit, the third lens unit, the fourth lens unit, the fifth lens unit, and the sixth lens unit have the following properties, the properties being standardized to the objective having a focal length of f=100 mm:

| Face | Radii | Distances [mm] | $n_e$ | $v_e$ | $\Delta\theta_{g,F}$ | Glass |
|---|---|---|---|---|---|---|
| First face of the first lens | 44.524 | 3.461 | 1.48915 | 70.0 | 0.0022 | S-FSL5 |
| Second face of the first lens | −106.362 | 3.479 | | | | |
| First face of the second lens | 24.858 | 4.673 | 1.49845 | 81.1 | 0.0280 | S-FPL51 |
| Second face of the second lens | −68.077 | 0.464 | | | | |
| First face of the third lens | −63.358 | 1.056 | 1.72538 | 34.5 | −0.0019 | S-NBH8 |
| Second face of the third lens | 35.626 | 10.788 | | | | |
| First face of the fourth lens | 23.810 | 4.188 | 1.65222 | 33.5 | 0.0070 | S-TIM22 |
| First face of the fifth lens | −23.810 | 1.038 | 1.61669 | 44.0 | −0.0065 | S-NBM51 |
| Second face of the fifth lens | 16.144 | 32.014 | | | | |

-continued

| Face | Radii | Distances [mm] | $n_e$ | $v_e$ | $\Delta\theta_{gF}$ | Glass |
|---|---|---|---|---|---|---|
| First face of the sixth lens | 166.151 | 0.727 | 1.59143 | 60.9 | −0.0018 | S-BAL35 |
| Second face of the sixth lens. | 16.615 | | | | | |

7. The optical system as recited in claim 6, wherein the radii and distances are variable within a range of ±10%, the indices of refraction $n_e$ within a range of about ±0.05 and the Abbe numbers $v_e$ are variable within a range of about ±5.

8. An objective for imaging of an object on an image acquisition unit, comprising:
 a first lens unit;
 a second lens unit;
 a third lens unit;
 a fourth lens unit;
 a fifth lens unit; and
 a sixth lens unit, wherein all of the lens units are disposed from the object in a direction of the image acquisition unit,
 wherein the first lens unit includes a converging lens,
 wherein the second lens unit is manufactured from a material whose deviation of the relative partial dispersion fulfills the following condition:

$\Delta\theta_{gF} > 0.025$, wherein the third lens unit includes a dispersive lens and is manufactured from a material whose deviation of the relative partial dispersion fulfills the following condition:

$\Delta\theta_{gF} < -0.0015$, wherein the fifth lens unit is manufactured from a material whose deviation of the relative partial dispersion fulfills the following condition:

$\Delta\theta_{gF} < -0.005$, and wherein the first lens unit, the second lens unit, the third lens unit, the fourth lens unit, the fifth lens unit, and the sixth lens unit have the following properties, the properties being standardized to the objective having a focal length of f=100 mm:

| Face | Radii | Distances [mm] | $n_e$ | $v_e$ | $\Delta\theta_{gF}$ | Glass |
|---|---|---|---|---|---|---|
| First face of the first lens | 38.827 | 2.768 | 1.48915 | 70.0 | 0.0022 | S-FSL5 |
| Second face of the first lens | −119.283 | 3.159 | | | | |
| First face of the second lens | 24.664 | 3.460 | 1.49845 | 81.1 | 0.0280 | S-FPL51 |
| Second face of the second lens | −68.056 | 0.443 | | | | |
| First face of the third lens | −63.339 | 1.038 | 1.72538 | 34.5 | −0.0019 | S-NBH8 |
| Second face of the third lens | 39.108 | 10.450 | | | | |
| First face of the fourth lens | 23.803 | 2.768 | 1.65222 | 33.5 | 0.0070 | S-TIM22 |
| First face of the fifth lens | −23.803 | 1.038 | 1.61669 | 44.0 | −0.0065 | S-NBM51 |
| Second face of the fifth lens | 15.236 | 34.497 | | | | |
| First face of the sixth lens | 166.101 | 0.727 | 1.59143 | 60.9 | −0.0018 | S-BAL35 |
| Second face of the sixth lens. | 16.610 | | | | | |

9. The optical system as recited in claim 8, wherein the radii and distances are variable within a range of ±10%, the indices of refraction $n_e$ within a range of about ±0.05 and the Abbe numbers $v_e$ are variable within a range of about ±5.

10. A telescope, comprising:
 an optical system that images an object on an image acquisition unit, the optical system including:
 a first lens unit;
 a second lens unit;
 a third lens unit;
 a fourth lens unit;
 a fifth lens unit; and
 a sixth lens unit, wherein all of the lens units are disposed from the object in a direction of the image acquisition unit with no intervening lens units,
 wherein the first lens unit includes a converging lens,
 wherein the second lens unit includes a converging lens and is manufactured from a material whose deviation of the relative partial dispersion fulfills the following condition:

$\Delta\theta_{gF} > 0.025$, wherein the third lens unit includes a dispersive lens and is manufactured from a material whose deviation of the relative partial dispersion fulfills the following condition:

$\Delta\theta_{gF} < -0.0015$, and wherein the fourth lens unit includes a converging lens, and
 wherein the fifth lens unit includes a dispersive lens and is manufactured from a material whose deviation of the relative partial dispersion fulfills the following condition:

$\Delta\theta_{gF} < -0.005$.

11. The telescope as recited in claim 10, wherein the telescope is a telescopic sight.

12. The telescope as recited in claim 10, wherein the first lens unit, the second lens unit, the third lens unit, the fourth lens unit, the fifth lens unit, and the sixth lens unit each have precisely one lens.

13. The telescope as recited in claim 10, wherein the sixth lens unit is displaceable along an optical axis of the objective.

14. The telescope as recited in claim 10, wherein the sixth lens unit includes a dispersive lens.

15. The telescope as recited in claim 10, wherein the fourth lens unit and the fifth lens unit form a dispersive element.

* * * * *